(12) United States Patent
Walton

(10) Patent No.: US 10,671,948 B2
(45) Date of Patent: Jun. 2, 2020

(54) WORK CYCLE MANAGEMENT

(71) Applicant: Trimble Inc., Sunnyvale, CA (US)

(72) Inventor: Paul Walton, Louisville, CO (US)

(73) Assignee: Trimble Inc., Sunnyvale, CA (US)

( * ) Notice: Subject to any disclaimer, the term of this patent is extended or adjusted under 35 U.S.C. 154(b) by 794 days.

(21) Appl. No.: 14/459,714

(22) Filed: Aug. 14, 2014

(65) Prior Publication Data

US 2016/0048795 A1 Feb. 18, 2016

(51) Int. Cl.
*G06Q 10/06* (2012.01)
*H04W 4/02* (2018.01)
*H04W 4/021* (2018.01)

(52) U.S. Cl.
CPC .... *G06Q 10/063114* (2013.01); *H04W 4/021* (2013.01)

(58) Field of Classification Search
None
See application file for complete search history.

(56) References Cited

U.S. PATENT DOCUMENTS

| | | | | |
|---|---|---|---|---|
| 6,076,030 | A * | 6/2000 | Rowe | E02F 3/435 172/4.5 |
| 7,831,464 | B1 * | 11/2010 | Nichols | G06F 11/3409 705/7.39 |
| 8,078,485 | B1 * | 12/2011 | Kraehmueller | G06Q 10/063 705/7.11 |
| 8,655,378 | B1 * | 2/2014 | Crossno | G06Q 10/0833 455/456.1 |
| 2012/0246039 | A1 * | 9/2012 | Fain | G06Q 10/08 705/32 |
| 2015/0363738 | A1 * | 12/2015 | Haci | G06O 10/063114 705/7.15 |

* cited by examiner

Primary Examiner — Alan S Miller
Assistant Examiner — Arif Ullah
(74) Attorney, Agent, or Firm — Kilpatrick Townsend & Stockton

(57) ABSTRACT

Methods and systems for asset and work flow management are disclosed. According to one embodiment, a method for work cycle management includes creating one or more work zones, creating a work cycle of events between the created work zones, creating an operating schedule for the events of work cycle at the zones, monitoring activity at the work zones and comparing the activity to the operating schedule and identifying schedule violations.

21 Claims, 9 Drawing Sheets

700

| Cycle | Zone 1 | | | Transit | Zone 2 | | | Transit | Zone 3 | | | Transit |
|---|---|---|---|---|---|---|---|---|---|---|---|---|
| | Enter | Duration | Exit | | Enter | Duration | Exit | | Enter | Duration | Exit | |
| 1 | - | 00:00 | 09:00:12 | 5:23 | 09:05:35 | 3:26 | 09:09:01 | 07:21 | 09:16:22 | 23:47 | 09:40:09 | 03:53 |
| 2 | 09:43:02 | 45:28 | 10:13:30 | 7:15 | 10:20:45 | 20:26 | 10:41:11 | 08:42 | 10:49:53 | 33:17 | 11:23:10 | 04:32 |
| 3 | 11:27:44 | 1:15:17 | 12:43:01 | 6:34 | 12:49:35 | 05:42 | 12:55:17 | 07:57 | 13:03:24 | 27:24 | 13:30:48 | 03:37 |
| | | | | | | | | | | | | |
| Min | | 45:28 | | 5:23 | | 3:26 | | 7:21 | | 23:47 | | 3:37 |
| Max | | 1:15:17 | | 7:15 | | 20:26 | | 8:42 | | 33:17 | | 4:32 |
| | | | | | | | | | | | | |

FIG. 7

WORK CYCLE MANAGEMENT

BACKGROUND

As margins in the asset operating business, such as construction, and the like, are reduced, it is becoming more important to properly manage the assets. For this reason, most asset operating businesses require their employees to have a phone on their person. That way, when the asset is in the field, the operator can be contacted and advised about where to operate the asset and what job should be performed.

However, this method of command and control is deleteriously unreliable. For example, the operator may not know their location, or may be wrong about their location. Additionally, the operator may misstate the job being performed, or spend more time on break than actually operating the asset. Each of these errors and omissions will further affect the already tight margins faced by the asset operating business.

BRIEF DESCRIPTION OF THE DRAWINGS

The drawings referred to in this Brief Description of the Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements.

FIG. 7 is a table of an example work cycle data for a worksite in accordance with one embodiment.

DESCRIPTION OF EMBODIMENTS

Figure 1:
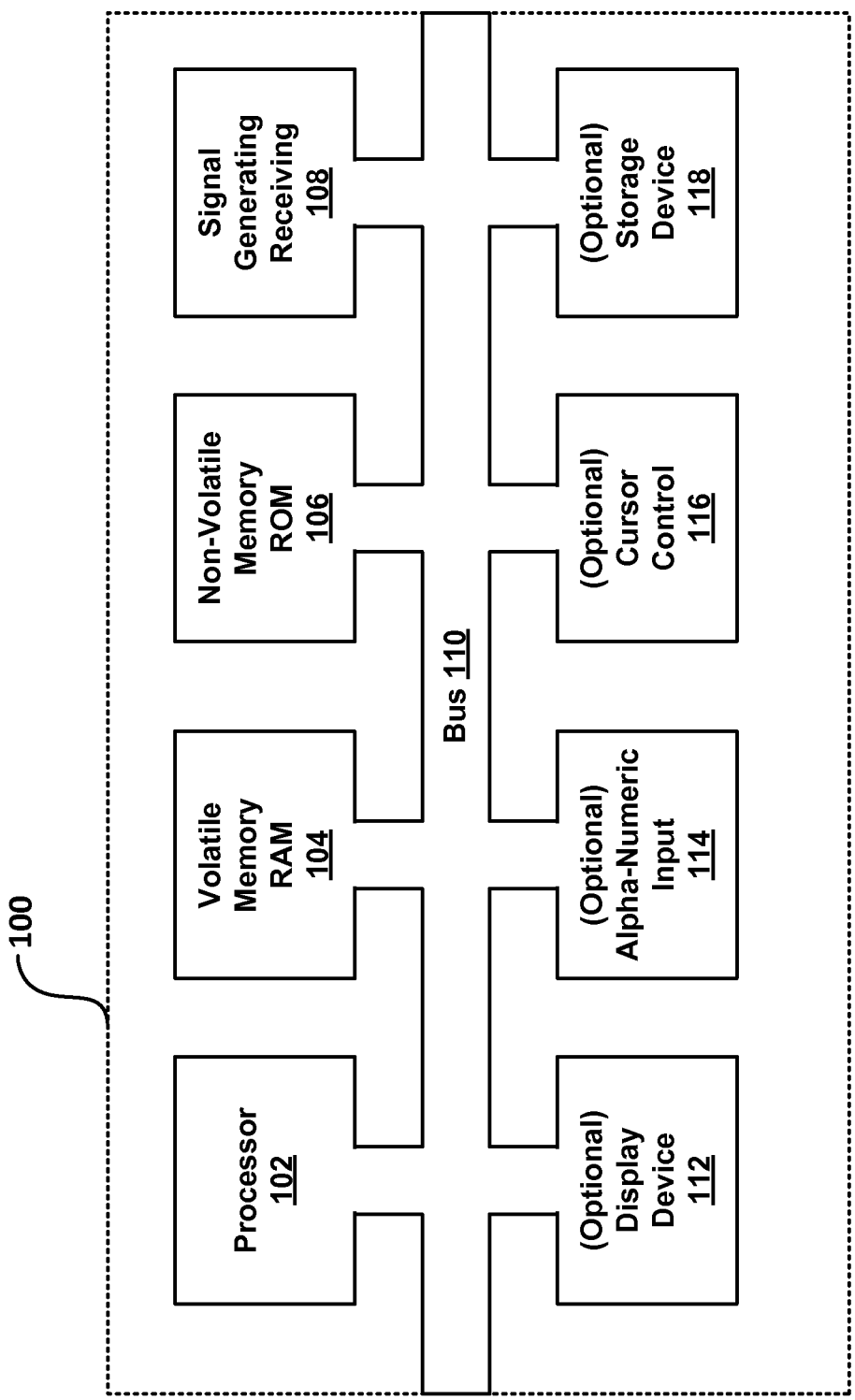
FIG. 1 is a block diagram of an example computer system used in accordance with one embodiment.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. In one embodiment, the computer-executable instructions are stored in a non-transitory computer-readable storage medium. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Overview

Embodiments relate to asset and work cycle management. Embodiments include a system that uses a mobile tracking device in a vehicle to capture and report key events in a working cycle.

The example work cycle management system uses the captured events to learn and benchmark the durations for a work cycle in an operation. For example, after observation for a given period of time, the system can determine appropriate minimum and maximum working times for a particular task and can establish normal threshold working times for particular events and/or work zones.

The system then enables a user to define an operating schedule for a fleet of vehicles based on the observed or learned work cycle. In one embodiment, this operating schedule can be presented graphically on a virtualized work environment.

The system can then monitor vehicles activity (via same events) in real time to detect deviations from the operating schedule. Operations that do not fall in the learned schedule or don't meet minimum or maximum thresholds can be flagged to an operator whereby non-compliance of operations and/or work flow can be addressed in real-time.

The system can be configured to notify user of specific schedule violations or areas where operational inefficiency is being impacted. The benefit of the real-time notification is improved cycle efficiency and improved work flow. In one embodiment, a user can make changes to vehicle operations in real-time to improve efficiency and productivity.

In one embodiment, embodiments provide automated learning of the behavior of vehicles operating in a repetitive work cycle based on captured event analytics. The monitored activities enable leverage work cycle to define a desired work operating schedule for the vehicle. Embodiments also monitor the activity against the work schedule to detect deviations/bottlenecks to improve efficiency and productivity by reducing schedule deviations. Repeating the cycle refines the work schedule and continues to make gains in productivity.

Example Computer System

With reference now to FIG. 1, a block diagram of an embodiment of an example computer system 100 used in accordance with various embodiments. It should be appreciated that computer system 100 is not strictly limited to be a computer system. As such, computer system 100 of the present embodiment may be well suited to be any type of computer device (e.g., server computer, portable computer device, desktop computer, mobile phone, pager, personal digital assistant, etc.). Within the present discussions, certain processes and steps are discussed that are realized, in one embodiment, as a series of instructions (e.g., software program) that reside within computer readable memory units and executed by a processor(s) of computer system 100. When executed, the instructions cause computer system 100 to perform specific actions and exhibit specific behavior that may be described in detail herein. For example, computer 100 may be used to implement aspects of methods described herein, such as the method illustrated by flow diagram 500 of FIG. 5 and/or the method illustrated by flow diagram 800 of FIG. 8.

Computer system 100 of FIG. 1 comprises an address/data bus 110 for communicating information, one or more central processors 102 coupled with bus 110 for processing information and instructions. Central processor unit(s) 102 may be a microprocessor or any other type of processor. The computer system 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. Computer system 100 also includes one or more signal generating and receiving devices 108 coupled with bus 110 for enabling computer system 100 to interface with other electronic devices and computer systems. The communication interface(s) 108 of the present embodiment may include wired and/or wireless communication technology.

Optionally, computer system 100 may include an alphanumeric input device 114 including alphanumeric and function keys coupled to the bus 110 for communicating information and command selections to the central processor(s) 102. The computer system 100 can include an optional cursor control or cursor directing device 116 coupled to the bus 110 for communicating user input information and command selections to the central processor(s) 102. The cursor-directing device 116 may be implemented using a number of well-known devices such as a mouse, a track-ball, a track-pad, an optical tracking device, and a touch screen, among others. Alternatively, it may be appreciated that a cursor may be directed and/or activated via input from the alphanumeric input device 114 using special keys and key sequence commands. The present embodiment is also well suited to directing a cursor by other means such as, for example, voice commands.

The computer system 100 of FIG. 1 may also include one or more optional computer usable data storage devices 118 such as a magnetic or optical disk and disk drive (e.g., hard drive or floppy diskette) coupled with bus 110 for storing information and instructions. An optional display device 112 may be coupled to bus 110 of computer system 100 for displaying video and/or graphics. It should be appreciated that optional display device 112 may be a cathode ray tube (CRT), flat panel liquid crystal display (LCD), field emission display (FED), plasma display or any other display device suitable for displaying video and/or graphic images and alphanumeric characters recognizable to a user.

Asset Management

Embodiments described herein provide a method and system for asset and workflow management. In general, embodiments described herein utilize a plurality of disparate sources for monitoring asset activity at one or more worksites. Each disparate source provides an asset report which is populated in a database. The database is organized to combine the plurality of asset reports resulting in an organized single source of asset information. The resulting database will provide a vast plethora of asset management data with a depth significantly greater than a single information source can provide.

Moreover, by utilizing a plurality of disparate sources to provide information, the asset manager's asset awareness is significantly increased while the opportunity for asset loss due to asset source reporter failure is significantly decreased. In other words, single asset source reporter failure will not result in complete loss of asset management capabilities for the asset manager.

Furthermore, due to the asset management capabilities described herein a significant business management tool is realized. That is, because the asset management system is useful at all levels of asset management, the asset management system provides significant value added features at the manufacture level, the rental/lease level, and the owner level. Moreover, the value added features may very likely be "sell themselves" features.

In the construction business, there are pluralities of assets required to complete a project such as building a supermarket. First, the site must be surveyed and marked; this requires survey equipment. Next, the site must be cleared and leveled; this requires graters, levelers, dozers, saws, debris transportation vehicles, etc. After clearing and leveling the site, the construction can begin; this requires diggers, pavers, concrete trucks, supply vehicles, cranes, tools, etc. Even with this example construction site, the number and cost of all the assets required is significant.

Due to the significant cost and specialization of much of the construction equipment used in the supermarket construction site, the construction company may own some assets, rent some assets and lease some assets, depending on the company and the cost/usefulness of the asset in question. For example, an asset that is rarely used may be cheaper to rent or lease than to buy, while an asset often used may be cheaper to buy than to rent or lease.

The present asset management system is beneficial across the entire range of own, lease, rent and manufacture. For example, as described in detail herein, the asset management system allows a user to track an asset including its location and operation. Thus, a maintenance schedule may be provided by the asset management system. In addition, excessive wear and tear or unscheduled maintenance needs will also be recognized by the asset management system.

Asset Management Network

Figure 2A:
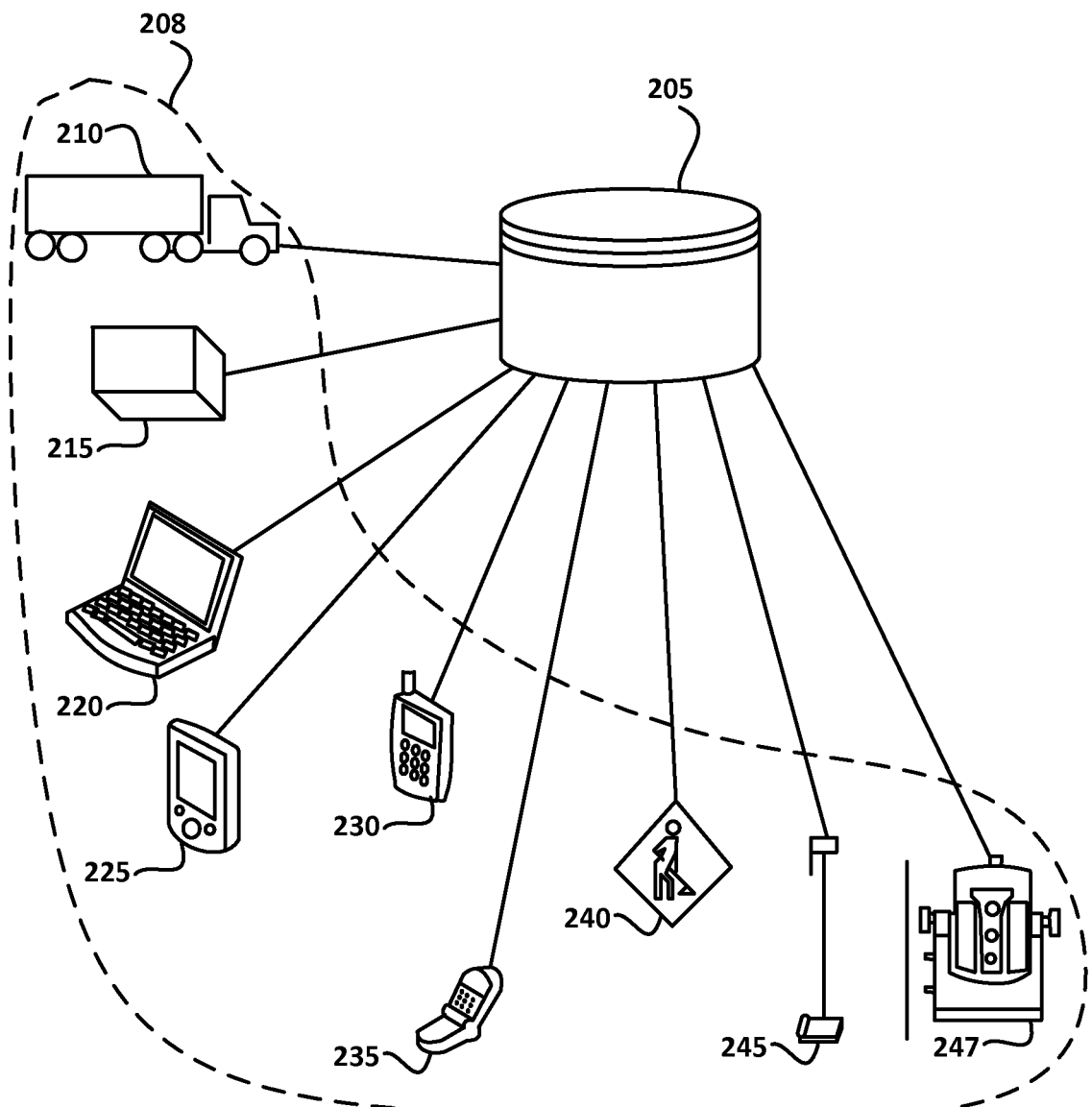
FIG. 2A is a network diagram of an example method for asset management in accordance with one embodiment.
Figure 2B:
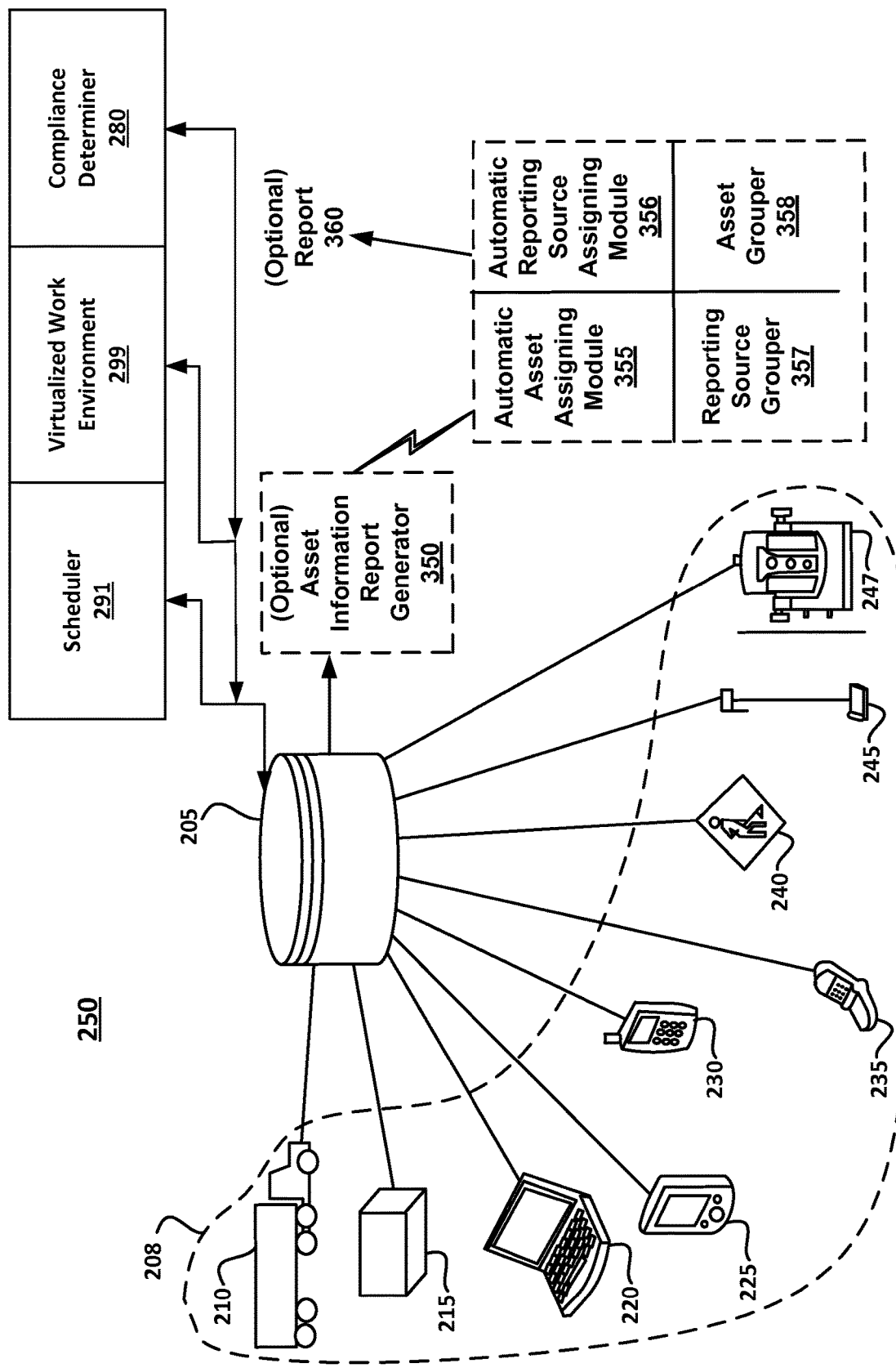
FIG. 2B is a network diagram of an example method for asset management including an asset information report generator and its modules in accordance with one embodiment.

With reference now to FIGS. 2A and 2B, a network diagram of an example method for asset management is shown in accordance with one embodiment. Asset management network 200 includes a database 205, and a plurality of reporting sources 208.

Database 205 receives information from at least two reporting sources 208 and the data within database 205 is organized such that information regarding an asset can be ascertained. For example, the data within database 205 may be organized such that information regarding a particular asset or a plurality of assets, can be ascertained or accessed.

Database 205 is coupled with a scheduler 291, virtualized work environment 299 and compliance determiner 280. The reporting sources 208 capture events to learn a benchmark schedule for operations. Based on the observed operations, minimum and maximum threshold values can be set for particular activities. These threshold values can be used to create an operating schedule for a particular set of assets.

In one embodiment, a virtualized work environment is created to graphically show operations based on the gathered information from reporting sources 208. With the work cycle graphically presented, real-time monitoring can be easily presented in an easy to understand graphical user interface.

In one embodiment, compliance determiner 280 monitors operations in real-time and compares monitored activity to the benchmark schedule. If operations fall outside the benchmark schedule, the compliance determiner may initiate an alert identifying operations that are deviations from the benchmark schedule. In one embodiment, the reporting source is a mobile device, such as mobile electronic device and monitors duration of transit between work zones for a particular work cycle. In this way, the reporting sources enable learning of work cycle events, such as refueling times for a specific vehicle. In one embodiment, maximum threshold durations and minimum threshold durations for events can be determined.

In one embodiment, database 205 is a single database on a single computer system such as computer system 100. In another embodiment, database 205 may actually consist of a plurality of databases on a single computer system or on a plurality of computer systems. Moreover, the plurality of databases may be in the same location or spread throughout a plurality of locations. Additionally, the plurality of databases may be wired or wirelessly coupled together to form a network of databases upon which the asset information may be stored. In one embodiment, the asset may be machinery, a vehicle, an electrical or mechanical device, an inanimate object or any other traceable item.

Plurality of reporting sources 208 include devices such as, but not limited to, permanently mounted device 210, asset mountable/detachable device 215, portable computing device 220, personal digital assistant 225, smart phone 230, mobile phone 235, human intelligence (HumInt) 240, global navigation satellite system (GNSS) survey rover 245 and machine control system 247. Although, a plurality of reporting sources 208 is shown, the list is example. It is appreciated that the reporting source 208 may include any number of reporting sources and reporting source methods including audio, video, text, Braille, code, passwords and the like. For example, reporting sources 208 can include electronic devices, GNSS enabled devices, machine controls, video enabled devices (e.g., camera enabled handheld devices (such as a mobile phone with camera/video, PDA with camera/video, watch with camera/video, etc.), video cameras, webcams, and the like), human sources, the asset being monitored, other assets, and the like. In one embodiment, any or all of the reporting sources 208 are capable of providing asset information including, but not limited to, location information, operation information and status information.

In one embodiment, asset mountable/detachable device 215 may be a TrimTrac™ device, a DCM300, SNM940 or SNM451 device (provided by Trimble Navigation Limited), a radio frequency identifier (RFID), a global navigation satellite system (GNSS) receiver, a video device providing a video feed, and the like. Moreover, each reporting source 208 may include capabilities such as position fixing, photography, text messaging, voice messaging, data messaging, radio frequency identification tag reading and the like. In one embodiment, any or all of the reporting sources 208 are monitoring devices. Furthermore, in one embodiment, any or all of the reporting sources 208 may be capable of asset operation monitoring. For example, any or all of the reporting sources 208 may be capable of being connected to the asset to monitor aspects of the asset including, but not limited to, a J-bus, a CAN-bus, a processor coupled with the asset, a diagnostic evaluator, an engine microprocessor, a mileage indicator, a speedometer, a tachometer, an oil pressure indicator, a wheel pressure indicator, a hydraulic indicator, an engine time monitor, an ignition switched power source, and the like.

With reference now to FIG. 2B, a network diagram of an example method for asset management is shown in accordance with another embodiment. In one embodiment, asset management network 250 includes a database 205, and a plurality of reporting sources 208 which are similar in form and function to that of FIG. 2A and are not described again in detail for purposes of brevity and clarity. Asset management system 300 also includes compliance determiner 280, virtualized work environment 299 and scheduler 291. Asset management network 250 also includes the optional asset information report generator 350 and optional asset information report 360. Further details of the description and operation of optional asset information report generator 350 and optional asset information report 360 are provided in the discussion of FIG. 3.

Asset management network 250 also includes an automatic asset assigning module 355, an automatic reporting source assigning module 356, a reporting source grouper 357 and an asset grouper 358. In general, these components are optional and are used to provide further organization to the asset information report 360. For example, a preference may be selected to group a plurality of assets based on location, etc. such as described in more detail herein.

Basically, automatic asset assigning module 355 is configured to assign an asset to a section in the asset information report 360. Automatic reporting source assigning module 356 is configured to assign first reporting source 208A, second reporting source 208B and any or all other reporting sources 208 to a section in asset information report 360. Reporting source grouper 357 is configured to group first reporting source 208A, second reporting source 208B and any or all other reporting sources 208 into at least one source group based on location. Asset grouper 358 is configured to group at least one asset into at least one group.

Asset Management System

Figure 3:
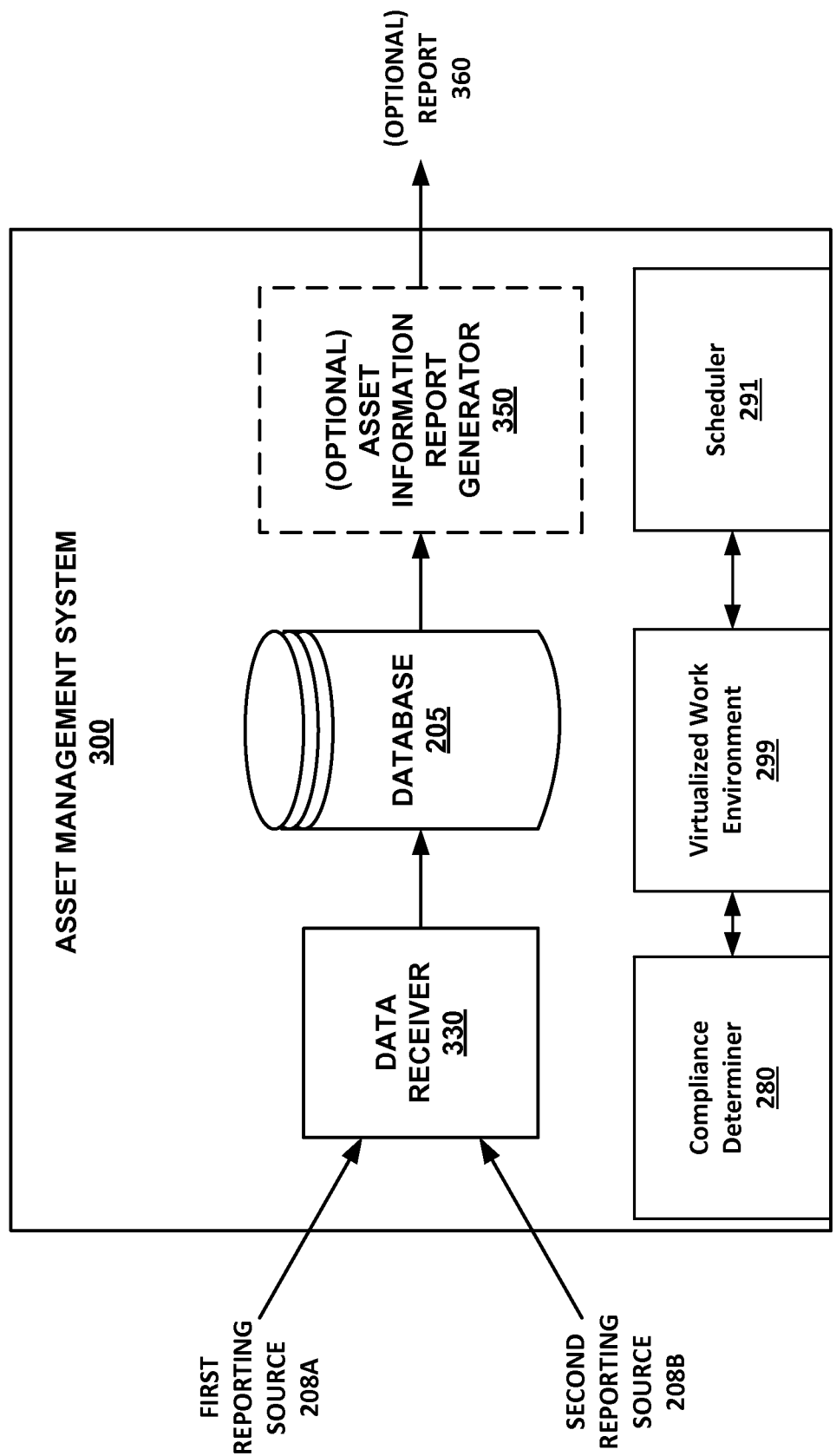
FIG. 3 is a block diagram of an example asset management system in accordance with one embodiment.

Referring now to FIG. 3, a block diagram of an example asset management system 300 is shown in accordance with one embodiment. In one embodiment, asset management system 300 receives input from a first reporting source 208A and a second reporting source 208B. A scheduler 291 uses the observed data from the reporting sources to determine a benchmark or standard schedule for a particular set of assets and/or tasks. In one embodiment, the activities reported by the reporting sources are graphically displayed using the virtualized work environment 299. Deviations from the benchmark schedule are identified and reported by the compliance determiner 280.

In general, the first reporting source 208A and the second disparate reporting source 208B are selected from the group of reporting sources 208 of FIG. 2A. Furthermore, the first reporting source 208A and second reporting source 208B may be similar or different reporting sources. Moreover, there may be more than two different reporting sources providing information to asset management system 300. For example, there may be three, four, seven, fifteen, or any number of different reporting sources providing information to asset management system 300. The use of two different reporting sources herein is shown merely for purposes of brevity and clarity. In one embodiment, the reporting sources input to asset management system 300 consists of information about an asset such as, but not limited to, operation, location, status, and the like.

In one embodiment, asset management system 300 includes a data receiver 330 and a database 205. In general, data receiver 330 is a wired or wireless connection that provides a connection between the asset management system 300 and the outside reporting sources such as first reporting source 208A and second reporting source 208B. In one embodiment, the connection is a network connection such as a local area network (LAN) connection, a wide area network (WAN) connection, a virtual private network (VPN), a cellular network, or the like. In another embodiment, the data receiver 330 will receive the information from the reporting sources via a direct connection. For example, the first reporting source 208A may be communicatively coupled (either wired such as via a universal serial bus (USB), firewire, or other data port, or wirelessly such as Bluetooth or the like) with the data receiver 330 and the information may be received directly to data receiver 330.

Data receiver 330 then (wired or wirelessly, via cell, WiFi, etc.) passes the received asset information to the database 205 wherein the information regarding the asset is stored. As stated herein, database 205 may be a single database on a single computer system or may actually consist of a plurality of databases on a single computer system or on a plurality of computer systems. Moreover, the plurality of databases may be in the same location or spread throughout a plurality of locations. Additionally, the plurality of databases may be wired or wirelessly coupled together to form a network of databases upon which the asset information may be stored.

In one embodiment, asset management system 300 may also include an optional report generator 350 which may provide an optional asset information report 360. In general, optional report generator 350 is one of a myriad of possible methods for organizing and presenting the information stored in database 205. For example, a user may query the asset management system 300 regarding one or more assets. The asset management system 300 may simply provide the results of the query to the optional report generator 350. Optional report generator 350 then generates optional asset information report 360 which would include the answers to the user's query. The optional asset information report 360 may be presented in a plurality of ways depending on user preference, system requirements and the like. For example, the optional asset information report 360 may be provided in a visual format, such as a piece of paper, or a graphic user interface (GUI) displayed on a cell phone, a PDA or laptop or desktop computer system. In another embodiment the optional asset information report 360 may be provided in an audible format, or in Braille, or the like.

In one embodiment, any or all of the reporting sources 208 providing information about the asset may be configured to provide information constantly, regularly scheduled information updates, or provide information updates only when requested by a user. For example, the reporting source may be a PDA 225 incorporating a global navigation satellite system (GNSS) receiver with positioning capabilities based on signals from Galileo, GPS, Glonass, WAAS-wide area augmentation service, Egnos and the like. The GNSS PDA 225 may provide constant location information updates to the database. This may be important if the asset is regularly changing location or tracking its movement is important. For example, the asset could include items such as, but not limited to, tracking a concrete truck or the load of concrete in the truck, an armored vehicle, a vehicle performing a lot of movement or the like. In the same manner, any of the information about the asset can be constantly updated, the use of location information herein is merely provided as one example for purposes of brevity and clarity.

However, if the actions of the asset do not require constant updates, then the information may not be constantly provided to the database 205. Using the location example again, if the asset is sitting in the same area, e.g., it is broken, unused, awaiting maintenance, or the like, the location information may only be provided on a scheduled update period. For example, in the morning the location of the asset may be checked and then again in the evening, or only once a day, or only once a week, etc. Additionally, the asset information may be modified based on the asset's status. That is, if the asset is unused, the asset information may be updated only periodically. However, when the asset becomes operational, the information may be updated on a more regular basis, or even constantly.

In addition, in one embodiment, the asset information is presented in the form of an asset information report 360 generated from the data in the database 205. In one embodiment, the data presented in asset information report 360 is a combination of all the information received about an asset from every reporting source 208. However, in another embodiment, the data presented in asset information report 360 is a combination of only portions of the information received about an asset from any or all of reporting sources 208.

For example, database 205 may have redundant information regarding the asset from a plurality of reporting sources 208. That is, more than one reporting source 208 may be providing asset location information. In one embodiment, all the information regarding the asset, including the redundant information, in the database may be used by report generator 350 when generating asset information report 360. However, in another embodiment, report generator 350 may remove the redundant information before generating asset information report 360 to reduce bandwidth, increase report clarity, or the like. In yet another embodiment, the redundant information may be removed at the database level to manage the size of database 205.

Moreover, in one embodiment asset information report 360 may be represented on a GUI, on paper, may be audibly provided, may be digitally provided to another database or application software, or may be provided in another user selected format. For example, the asset information report may be provided in an other than visual format for a user during times, such as, when the asset information report is being provided over a communications network, or for a visually impaired user, or for a user who cannot refer to a visual asset information report for operational/safety reasons, or the like.

Reporting Sources

Referring to FIG. 2A, examples of reporting sources 208 include, but are not limited to, permanently mounted devices 210, asset mountable/detachable device 215, portable computing device 220, personal digital assistant (PDA) 225, smart phone 230, mobile phone 235 and human intelligence 240. Refer to the above discussion of reporting sources for more information on reporting sources. Examples of asset mountable/detachable devices 215 are DCM300, SNM940, SNM451, TrimTrac™ devices, mountable reporting source, and an RFID tag type reporting source.

For more information about TrimTrac™ refer to U.S. patent application Ser. No. 10/952,607 by Nichols et al, filed on Sep. 28, 2004 and entitled "Method and System For Controlling A Valuable Movable Item", assigned to the assignee of the present application and refer to U.S. patent application Ser. No. 11/076,923 by Workman et al, filed on Mar. 31, 2005 and entitled "A portable Motion-Activated Position Reporting Device", assigned to the assignee of the present application.

Different types of reporting sources have different capabilities. For example, a reporting source typically has a constant supply of power and is capable of communicating relatively large amounts of asset information frequently over relatively large distances. An RFID tag type reporting source does not have a supply of power and is capable of communicating a relatively small amount of asset information, such as an identifier, over a relatively short distance. Typically, the more capabilities that a reporting source has the more expensive it is. Therefore, it does not make good business sense to associate expensive reporting sources with relatively inexpensive assets. According to one embodiment, this concern is addressed, among other things, by associating different types of reporting sources with different assets based on the characteristics of the assets and objectives of the construction project.

Information about an Asset

According to one embodiment, information from a first reporting source about an asset is received and information from a second reporting source about the asset is also received. The information received from the two reporting sources can be stored in a database resulting in stored information. Refer to the description of step 406 (FIG. 4) for more information on populating a database.

According to one embodiment, the information is asset location data. Examples of asset location data include, but are not limited to, whether a vehicle is at a site, on a road, or in the correct area of a site. According to another embodiment, the information is asset operation data. Examples of asset operation data include, but are not limited to, speed an asset is traveling, time since the last oil change or other scheduled maintenance was performed on the asset, any indications of potential malfunction of the asset, and the activity the vehicle is currently engaging in, has previously engaged in, or will engage in. Squeaks may be an indication of potential malfunction of the asset.

The information can be used to determine how much an asset has been used, where the asset is located, whether it is being used appropriately, whether it has left a designated area as demarcated, for example, by a geo-fence, when the asset needs maintenance, which service truck would be best for performing the maintenance, and so on.

Data Collectors

A data collector can be a device that a person is capable of holding in their hand. As already stated, an employee can walk around the area with a data collector that is capable of receiving the identifier transmitted by the RFID tags that are associated with assets. The data collector can communicate the identifier to the asset management system along with other information about the asset. The employee can input information into a data collector that is communicated, for example, to an asset management system. The employee may display information about an asset on the data collector in whatever way is beneficial to the employee. For example, the data collector may beep and display "Backhoe 123 just arrived."

A data collector, according to one embodiment, uses wireless technology. A Trimble® Recon® and a GIS type data collectors are examples of data collectors. Mobil Tech International™ also manufacturers data collectors. According to one embodiment, a data collector may be a data collector as described in U.S. patent application Ser. No. 10/651,586 by York, filed on Aug. 29, 2003 and entitled "Portable Electronic Instrument with Field-Replaceable Battery/Input/Output Module", assigned to the assignee.

Figure 4:
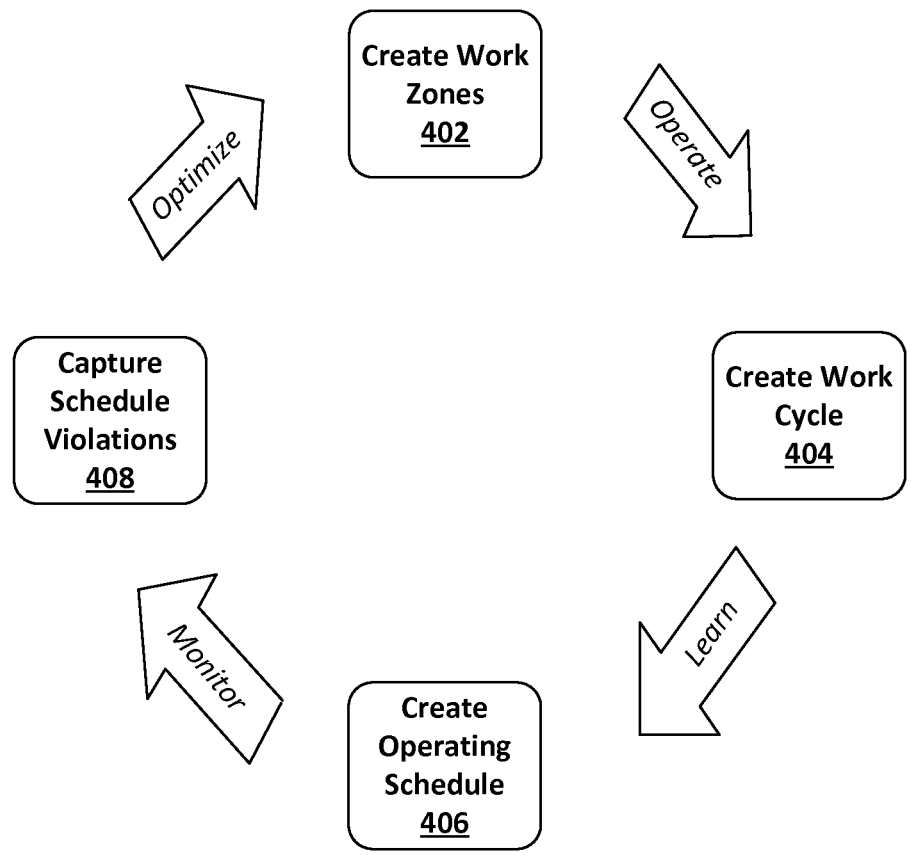
FIG. 4 is a block diagram of an example work cycle process in accordance with one embodiment.
Figure 5:
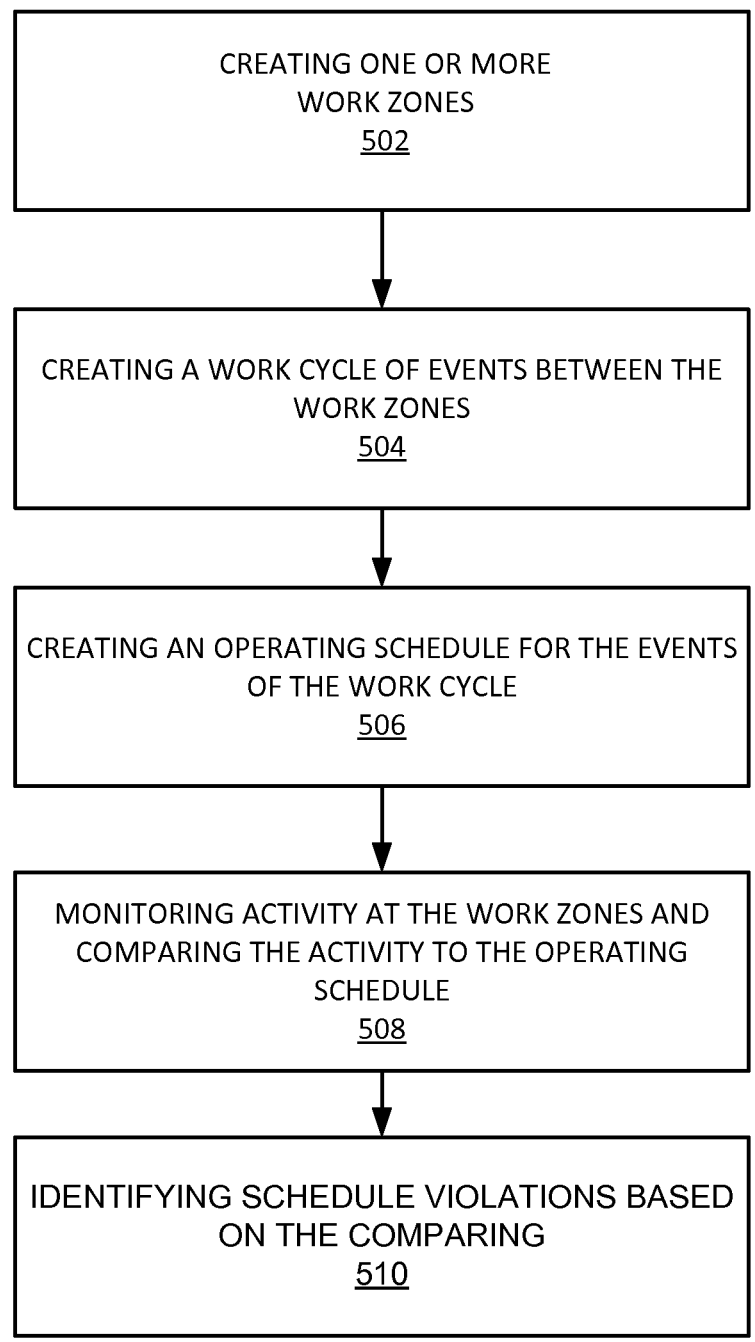
FIG. 5 is a flow diagram of an example method of work cycle management in accordance with one embodiment.

FIG. 4 shows an example overview for asset and work cycle management according to one embodiment. FIG. 5 illustrates a flow chart of an example method for work cycle management.

Creating a Work Zone

At 402 of FIG. 4 and 502 of FIG. 5, embodiments can be used to create one or more work zones. A work zone is any defined area for which one or more activity or task takes place. For example, a work zone can be a location where vehicles and/or equipment congregate, receive fuel, dump or receive loads, perform specific tasks, etc. In one embodiment, a work zone can be a loading zone for materials or a refueling station. In one example, a work zone is a geofenced area. In one embodiment, the work zone can be graphically displayed on a virtualized map of a worksite. In one embodiment, a map of a work site is graphically augmented with geofenced outlines representing one or more work zones.

In one embodiment, one or more electronic reporting devices are used to capture work events that take place at a particular work zone. For example, when a truck or other equipment enters or exits a work zone, these events are considered work events and are monitored and captured by the reporting sources. In one embodiment, the reporting sources can monitor entry and exit times and can determine duration of work time for a particular task at a work zone. Additionally, the reporting sources are able to capture transit time of a vehicle or other equipment between two or more work zones.

Based on the monitoring of work cycle events, embodiments learn a baseline or benchmark work cycle for a particular vehicle performing a task or set of tasks at one or more work zone. It is appreciated that a work zone can also be an area where two or more assets interact to perform a task, such as transferring material from one vehicle to another.

Creating Work Cycle

FIG. 4 shows a block diagram of an example system for work cycle management. FIG. 5 is a flow diagram 500 showing an example method for work site management in accordance with embodiments. It is appreciated that one or more procedures of flow diagram 500 of FIG. 5 may be performed on a computer system and could also be stored on a non-transitory computer-readable storage medium as a set of instructions executable by a computer system, such as computer system 100 of FIG. 1.

At 404 of FIG. 4 and 504 of FIG. 5, in one embodiment, the reporting devices collect the entry and exit events associated with a target vehicle under normal operation. In one embodiment, a user can define a period of time to allow the system to learn a benchmark work cycle, based on observed activities. It is appreciated that a longer time allowed for learning may result in a more accurate benchmark work cycle than a shorter observation time, as more data points can be collected with longer observation durations. One embodiment analyzes work zone events to determine the durations between the captured events. The example work cycle management system can isolate the order of the events to identify the repetitive event pattern for the work cycle.

At 406 of FIG. 4 and 506 of FIG. 5, one embodiment includes creating a template or benchmark for the work cycle with proposed min and max durations for each phase of the work cycle. Using a graphical user interface that shows a virtualized work environment, embodiments can show the work cycle events and durations to the user who can subsequently modify the pattern according to any particular metric or identified bottleneck.

In one embodiment, storage of these work cycle templates is enabled and this provides management of a library of various work cycle templates. It is appreciated that a single work cycle can be applied to one or more vehicles or assets.

Detect Cycle Violations

At 408 of FIG. 4 and 508 of FIG. 5, embodiments monitor events for vehicles associated with active operation schedules to determine violations in step 510 of FIG. 5. For example, each segment in the work cycle is measured and monitored as a relative duration. The monitoring system will trigger a schedule violation every time the vehicle misses a complete phase in the work cycle. If the vehicle takes less time than the minimum duration for a phase in the work cycle, a violation can be triggered and reported. If the vehicle takes more time than the maximum duration for a phase in the work cycle, a violation can be reported.

Violations can be reported in any number of ways, for example, a user can receive an email or text notification of schedule violation or can view list view of schedule violations on a map with link to listed details. In one embodiment, a user can make adjustments to operational environment and monitor effectiveness of changes. In another embodiment, a user can refine all aspects of the work schedule to continue to improve cycle times. At 512 of FIG. 5, real-time notification of identified violations is performed.

In one embodiment, embodiments provide automated learning of the behavior of vehicles operating in a repetitive work cycle based on captured event analytics. The monitored activities enable leverage work cycle to define a desired work operating schedule for the vehicle. Embodiments also monitor the activity against the work schedule to detect deviations/bottlenecks to improve efficiency and productivity by reducing schedule deviations. Repeating the cycle refines the work schedule and continues to make gains in productivity.

Example Electronic Map of Worksite

Figure 6:
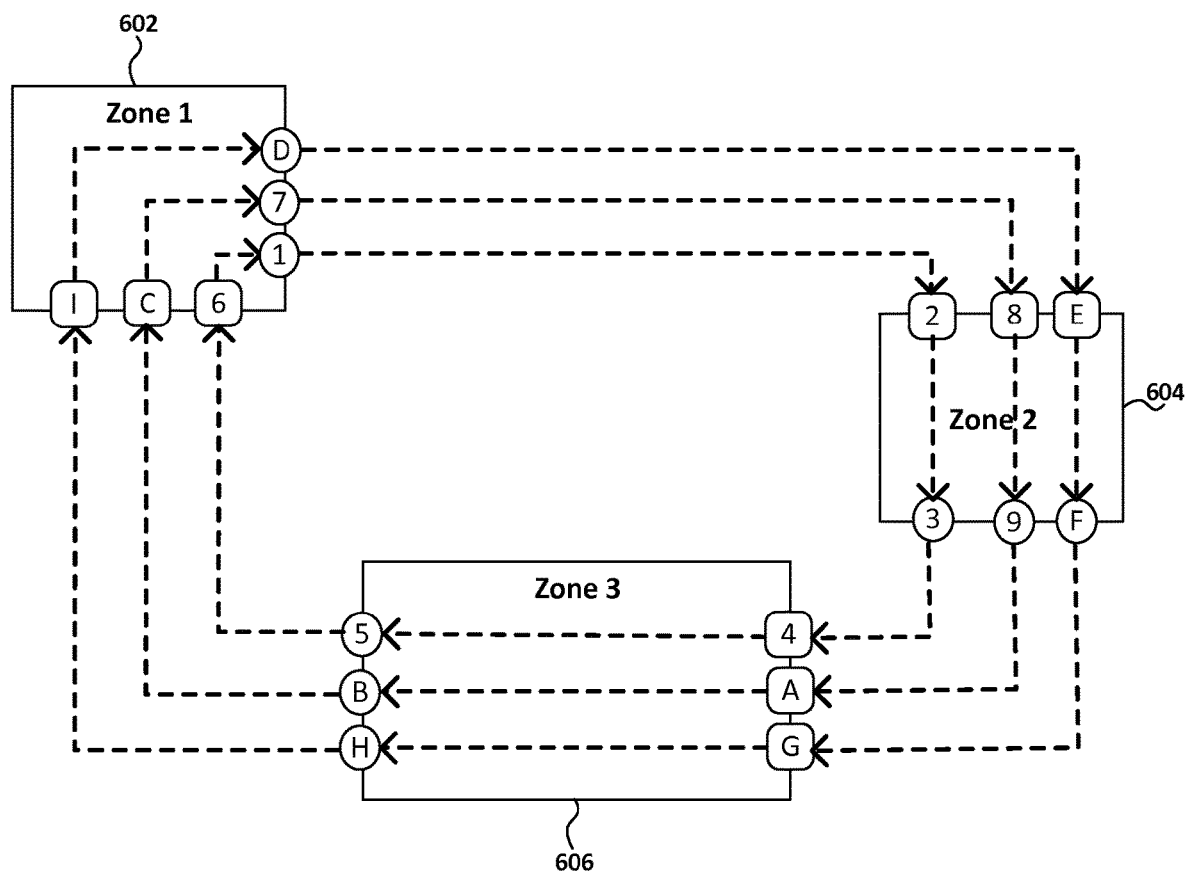
FIG. 6 is a diagram of an example electronic map of a worksite in accordance with one embodiment.

FIG. 6 shows an illustration of an example electronic map of a worksite 600 in accordance with embodiments. The worksite map 600 includes work zone one 602, work zone two 604 and work zone three 606. At each work zone, entry and exit information is compiled for vehicles going in and out of each work zone. Table 700 of FIG. 7 shows entry and exit times for three different cycles between work zones 602, 604 and 606. Based on the entry and exit times, duration of work at each work zone and transit time between the work zones can be determined.

For example, from the table 700 of FIG. 7 in conjunction with FIG. 6, cycle one exits work zone 602 at exit event "1" of FIG. 6 and enters work zone 604 at entrance event "2," exits work zone 604 at exit event "3," enters work zone 606 at entrance event "4," exits work zone 606 at exit event "5" and completes the cycle by entering work zone 601 at entrance event "6."

Cycle two exits work zone 602 at exit event "7" of FIG. 6 and enters work zone 604 at entrance event "8," exits work zone 604 at exit event "9," enters work zone 606 at entrance event "A," exits work zone 606 at exit event "B" and completes cycle two by entering work zone 601 at entrance event "C."

Cycle three exits work zone 602 at exit event "D" of FIG. 6 and enters work zone 604 at entrance event "E," exits work zone 604 at exit event "F," enters work zone 606 at entrance event "G," exits work zone 606 at exit event "H" and completes cycle two by entering work zone 601 at entrance event "I."

Figure 8:
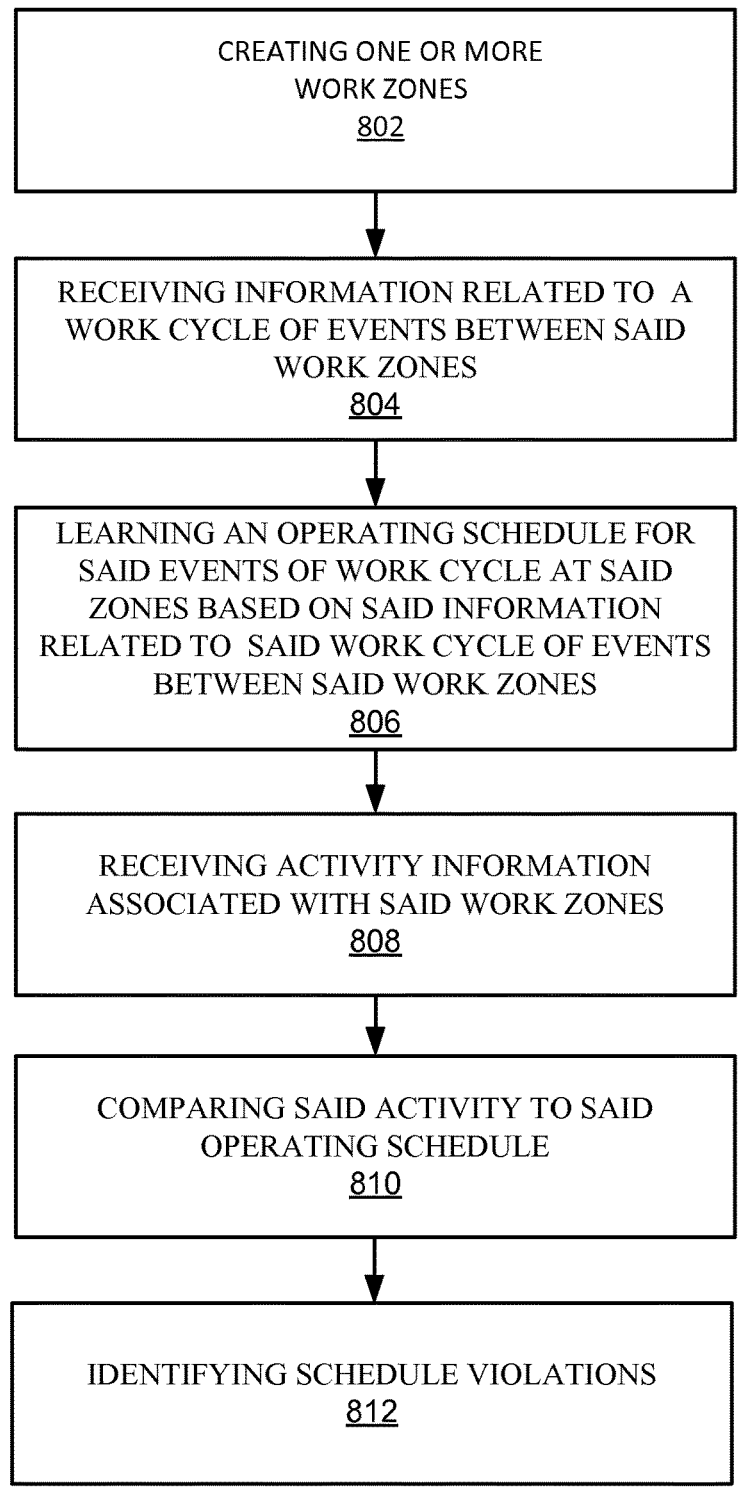
FIG. 8 is a flow diagram of an example method for work cycle monitoring in accordance with embodiments.

FIG. 8 is a flow diagram 800 of an example method for work cycle monitoring in accordance with embodiments. It is appreciated that one or more procedures of flow diagram 800 of FIG. 8 may be performed on a computer system and could also be stored on a non-transitory computer-readable storage medium as a set of instructions executable by a computer system, such as computer system 100 of FIG. 1.

At 802, the method includes creating virtual boundaries associated with one or more work zones. For example, in FIG. 6, virtual boundaries outlining work zones 602, 604 and 606 are created. In one embodiment, the boundaries are created by the virtualized work environment 299 of FIG. 2B. It is appreciated that virtualized work site 600 of FIG. 6 may include one or more satellite images.

At 804, the method includes receiving information related to a work cycle of events between said work zones. In one embodiment, the data is received at a database, for example database 205 of FIG. 2A. In one embodiment, the information related to a work cycle of events between said work zones is gathered by one or more reporting sources such as reporting source 208 of FIG. 2A. In one embodiment, the information related to a work cycle of events between said work zones may include position data such as global positioning system (GPS) data.

At 806, the method includes learning an operating schedule for the events of work cycle at the work zones based on the information related to the work cycle of events between the work zones. In one embodiment, the learning is performed by the scheduler module 291 of FIG. 2B.

At 808, the method includes receiving activity information associated with the work zones. In one embodiment, the activity information is gathered by one or more reporting sources such as reporting source 208 of FIG. 2A.

At 810, the method includes comparing the monitored activity to the operating schedule. In one embodiment, compliance of the schedule is performed by the compliance determiner 280 of FIG. 2B by comparing to a schedule determined by scheduler 291 of FIG. 2B.

At 812, the method includes identifying schedule violations. In one embodiment, compliance of the schedule is performed by the compliance determiner 280 of FIG. 2B. In one embodiment, schedule violations can be used to identify bottlenecks between various events of a work cycle. Identifying the bottlenecks enabled improved efficiency and overall improved cycle efficiency.

In one embodiment, exceptions can be defined to allow events that would normally trigger a schedule violation to continue in exceptional conditions such as heavy traffic, machinery breakdowns, weather conditions, etc. Allowing exception conditions reduces the number of violations reported when a known condition exists that would alter the normal or benchmark cycle schedule.

In another embodiment, in response to a schedule violation, instant communication to a potential bottleneck can be initiated. For example, if a vehicle is late arriving to a work zone, a scheduling operator can call or message the driver in real-time to see why the vehicle is late or delayed.

The examples set forth herein were presented in order to best explain and to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A method for work cycle management of a construction project at a construction site, the method comprising:
   creating, by one or more processors in a computer system, a plurality of physically seperated work zones associated with the construction project;
   creating, by a plurality of different types of reporting sources in said computer system, a plurality of information about an asset at said construction site during a plurality of cyclically repeated first work cycles of events, wherein each first work cycle of events comprises a sequence of events, each event occurring at one of the physically separated work zones at said construction site, and wherein each of said plurality of different types of reporting sources is configured to monitor activity of the asset at the construction site;

receiving, by said computer system, said plurality of information about said asset from said plurality of different types of reporting sources;

determining, by said one or more processors, that a first portion of said plurality of information from a first type of reporting source monitoring the asset at said construction site contains redundant information with a second portion of said plurality of information from a second type of reporting source monitoring the asset at said construction site, the first type of reporting source and the second type of reporting source being different electronic devices that are monitoring the asset at said construction site;

removing by said one or more processors, said first portion of said plurality of information so that said plurality of information comprising said second portion is devoid of redundant information;

learning, by said one or more processors, an operating schedule of said asset for the sequence of events based on said second portion of said plurality of information that is devoid of redundant information, wherein the operating schedule includes timing information related to position of the asset for each of the events of the sequence of events;

creating, by the plurality of different types of reporting sources in said computer system, additional information about the asset during a plurality of cyclically repeated second work cycles of events, wherein each second work cycle of events comprises an additional occurrence of the sequence of events of the first work cycles of events, and wherein the additional information includes timing information related to position of the asset for each of the events of the sequence of events of the second work cycles of events;

comparing, by a compliance determiner in said computer system, said timing information of said additional information to said timing information of said operating schedule; and identifying, by said one or more processors, schedule violations based on said comparing.

2. The method of claim 1 wherein one or more of the different types of reporting sources comprises a mobile electronic device.

3. The method of claim 1 wherein creating the plurality of physically separated work zones comprises:
by said computer system, geofencing the physically separated work zones on an electronic map.

4. The method of claim 1 wherein said sequence of events includes:
entry and exit information of the asset for at least one of the physically separated work zones.

5. The method of claim 1 wherein said sequence of events includes:
duration of transit of the asset between a first and a second of the physically separated work zones.

6. The method of claim 1 wherein the asset is a particular vehicle, and one or more of the different types of reporting sources comprises a mobile device coupled with the particular vehicle.

7. The method of claim 1 wherein said operating schedule comprises minimum and maximum duration thresholds for each of the physically separated work zones.

8. A method for work cycle monitoring at a construction site, the method comprising:

creating, by one or more processors in a computer system, virtual boundaries associated with a plurality of physically separated work zones;

receiving, by a plurality of different types of reporting sources in said computer system, a plurality of information related to an asset at the construction site during a plurality of cyclically repeated first work cycles of events, wherein each first work cycle of events comprises a sequence of events, each event occurring at one of the physically separated work zones at the construction site, and wherein each of said plurality of different types of reporting sources is configured to monitor activity of the asset at the construction site;

receiving, by said computer system, said plurality of information about said asset from said plurality of different types of reporting sources;

determining, by said one or more processors, that a first portion of said plurality of information from a first type of reporting source monitoring the asset at the construction site contains redundant information with a second portion of said plurality of information from a second type of reporting source monitoring the asset at the construction site, the first type of reporting source and the second type of reporting source being different electronic devices that are monitoring the asset at the construction site;

removing, by said one or more processors, said first portion of said plurality of information so that said plurality of information comprising said second portion is devoid of redundant information;

learning, by said one or more processors, an operating schedule of said asset for the sequence of events based on said second portion of said plurality of information that is devoid of redundant information, wherein the operating schedule includes timing information related to position of the asset for each of the events of the sequence of events;

receiving, by said one or more processors, additional information about the asset during a plurality of cyclically repeated second work cycles of events, wherein each second work cycle of events comprises an additional occurrence of the sequence of events of the first work cycles of events, and wherein the additional information includes timing information related to position of the asset for each of the events of the sequence of events of the second work cycles of events;

comparing, by said one or more processors, said timing information of said additional information to the timing information of said operating schedule; and identifying, by said one or more processors, schedule violations.

9. The method of claim 8 wherein one or more of the different types of reporting sources comprises a mobile electronic device.

10. The method of claim 8 wherein creating the virtual boundaries comprises:
geofencing, by said computer system, the physically separated work zones on an electronic map.

11. The method of claim 8 wherein said sequence of events includes:
entry and exit information of the asset for at least one of the physically separated work zones.

12. The method of claim 8 wherein said sequence of events includes:

duration of transit of the asset between a first and a second of the physically separated work zones.

13. The method of claim 8 wherein the asset is a particular vehicle, and one or more of the different types of reporting sources comprises a mobile device coupled with the particular vehicle.

14. The method of claim 8 wherein said operating schedule comprises minimum and maximum duration thresholds for each of the physically separated work zones.

15. A system for work cycle management of a construction site, the system comprising:
- a virtualized work environment comprising a plurality of physically separated work zones, said virtualized work environment implemented by a computer system;
- a database, coupled with said computer system, for storing a first work cycle of events, wherein the first work cycle of events comprises a sequence of events, each event occurring at one of the physically separated work zones;
- a plurality of different types of reporting sources for creating a plurality of information about an asset at the construction site during a plurality of cyclically repeated first work cycles of events, wherein each occurrence of the first work cycle of events comprises the sequence of events, and wherein each of said plurality of different types of reporting sources is configured to monitor activity of the asset at the construction site;
- a scheduler, implemented by said computer system, configured to:
  - receive said plurality of information about said asset from said plurality of different types of reporting sources;
  - determine that a first portion of said plurality of information from a first type of reporting source monitoring the asset at the construction site contains redundant information with a second portion of said plurality of information from a second type of reporting source monitoring the asset at the construction site, the first type of reporting source and the second type of reporting source being different electronic devices that are monitoring the same asset at the construction site;
  - remove said first portion of said plurality of information so that said plurality of information comprising said second portion is devoid of redundant information; and
  - learn an operating schedule of said asset for the sequence of events based on said second portion of said plurality of information that is devoid of redundant information, wherein the operating schedule includes timing information related to position of the asset for each of the events of the sequence of events,
- wherein the plurality of different types of reporting sources are configured to create additional information about the asset during a plurality of cyclically repeated second work cycles of events, wherein each second work cycle of events comprises an additional occurrence of the sequence of events of the first work cycles of events, and wherein the additional information includes timing information related to position of the asset for each of the events of the sequence of events of the second work cycles of events;
- a compliance determiner, implemented by said computer system, for comparing said timing information of said additional information to said timing information of said operating schedule; and
- a reporter, implemented by said computer system, configured to report schedule violations determined based on said comparing.

16. The system of claim 15 wherein one or more of the different types of reporting sources comprises a mobile electronic device.

17. The system of claim 15 wherein the physically separated work zones are geofenced physically separated regions in said virtualized work environment.

18. The system of claim 15 wherein the plurality of different types of reporting sources are configured to capture entry and exit information of the asset associated with at least one of the physically separated work zones.

19. The system of claim 15 wherein the plurality of different types of reporting sources are configured to capture duration of transit of the asset between a first and a second of said one or more of the physically separated work zones.

20. The system of claim 15 wherein the asset is a particular vehicle, and one or more of the different types of reporting sources comprises a mobile device coupled with the particular vehicle.

21. The system of claim 15 wherein the plurality of different types of reporting sources comprises a global positioning system.

* * * * *